United States Patent

Mason et al.

[11] Patent Number: 5,926,994
[45] Date of Patent: Jul. 27, 1999

[54] ARTIFICIAL FISHING LURE

[76] Inventors: Marvin Howard Mason, 545 Harrisburg Rd; Richard Michael Mason, 635 Boone Smith Rd., both of Alexandria, Ky. 41001

[21] Appl. No.: 08/944,533

[22] Filed: Oct. 7, 1997

[51] Int. Cl.⁶ ..................................... A01K 85/00
[52] U.S. Cl. .......................................... 43/42.09; 42/42.26
[58] Field of Search ................................ 43/42.03, 42.09, 43/42.26, 42.27

[56] References Cited

U.S. PATENT DOCUMENTS

| | | | |
|---|---|---|---|
| 1,457,926 | 6/1923 | Dunkelberger | 43/42.09 |
| 2,050,877 | 8/1936 | Courtland | 43/42.26 |
| 2,317,781 | 4/1943 | Lehto | 43/42.26 X |
| 4,038,774 | 8/1977 | Misiak | 43/42.09 |

*Primary Examiner*—Robert P. Swiatek

[57] ABSTRACT

An artificial fishing lure, composed of a plastic injection molded body, having hangers for hooks. a line tie point, a lip for diving, a rib at each side for controlling water flow. an elliptical body shape, a groove molded into each side of the body beginning at the nose and continuing to a point just aft of the nose, where a fin assembly is mounted. Water is passed along the groove, through a channel in the rib at the side of the body, where it is forced outward causing an increase of pressure on the underside of the fin, resulting in a lifelike motion of the fin.

4 Claims, 1 Drawing Sheet

Section B B

Section A A

ARTIFICIAL FISHING LURE

CROSS-REFERENCES TO RELATED APPLICATIONS

U.S. Pat. No. 5,661.921.

BACKGROUND OF THE INVENTION

1) Field of the Invention

This invention relates to fishing lures and the application of apparatus added to the lure body for the purpose of attracting game fishes to the lure.

2) Background Art

Many varieties of artificial fishing lures are used by anglers in pursuit of game fishes. Each lure has in common some method for adding attraction to the lure for the purpose of enticement of the preferred species. These methods include rattles, colors, appendages and others. Mason, U.S. Pat. No. 5,661,921 provided a means of adding gamefish attracting fins to a lure body. Mason, U.S. Pat. No. 5,661,921 used a combination ring and fin assembly that slides over the head of the lure, and requires the angler to remove the attaching line and then reconnect after the ring and fin assembly is in place. This new method makes use of a ball and socket as the attaching means. This method enables the angler to remove and install replacement fins at will, without the requirement of re-tying the line each time a change is made.

SUMMARY

A molded plastic fishing lure, incorporating two replaceable molded fins, mounted on the head of the lure. The fins and mount being of a design and manufacture to provide gainefish attracting motion when said lure is moved through the water, or when currents flow past the lure causing movement of the fins.

A lip, or bill is molded into the lower portion of the lures head for the purpose of causing the lure to dive during retrieve. The side edges of the lip continue past the head portion of the lure in an upward arc, forming a rib at each side, just aft of the lures head. A groove or indentation is molded into the head just above the rib, providing for the flow of water past the side of the lure body to a clannel located under the rib at a point just aft of, and below the eye socket. The groove then continues past the rib to a point at the side of the lure body under the installed fin, producing water pressure on the underside of the fin surface.

The design of the mount of the fins incorporates a ball and socket assembly as the attachment at each side of the body. The eye area of the lure body is molded as a socket, while the fin assembly has molded into it's end a ball. The ball is inserted into the socket as the first attaching point. The ball and socket are sized so as to provide for a snug fit of the two parts, the ball then becomes the eye of the lure. The neck of the fin is then routed through a notch cut into the rib edge located on the side of the lure body just aft of the head. The notch is undercut, and when the neck of the fin is pressed into place, provides a snug fit of the two parts.

DETAILED DESCRIPTION

Figure 3:
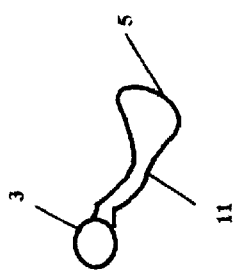
FIG. 3 View of the fin showing the ball, neck, and flat flexible portion.
Figure 2:
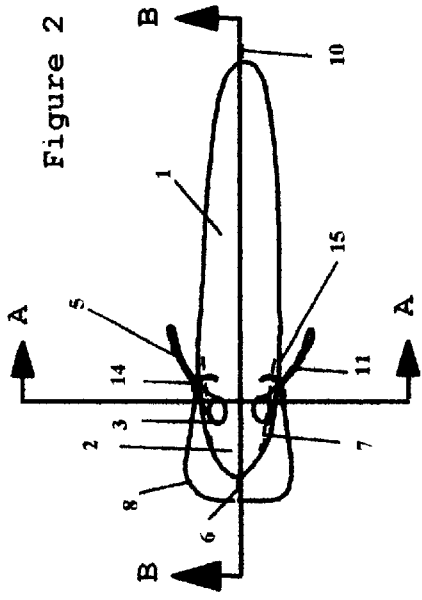
FIG. 2 Top view of the lure showing the relationship of the lip and rib to the notch at each side of the lure body, with the fins mounted.
Figure 1:
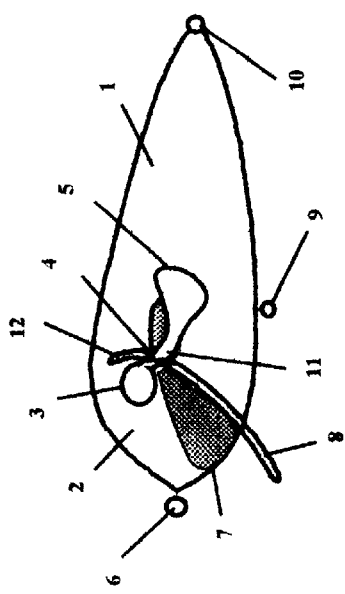
FIG. 1 Detailed side view of the lure, showing the lip and rib, groove, fin and mount, and hook and line tie attaching points.
Figure 6:
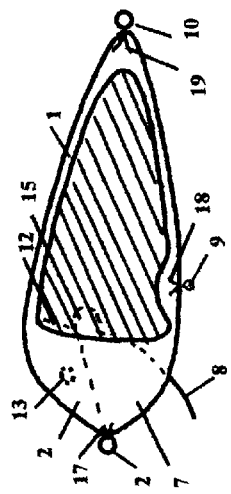
FIG. 6 A sectional side view of the lure body, showing the attaching points for the hooks and line tie.
Figure 5:
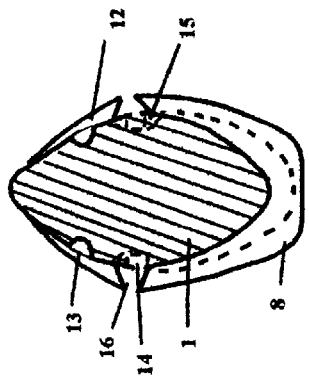
Figure 4:
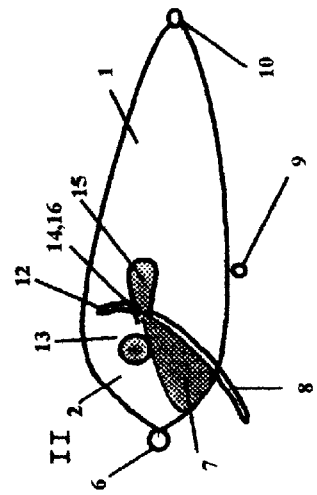
FIG. 4 Side view of the lure body with the fin removed showing the notch in the rib, the socket, the groove, and the channel, FIG. 5 Sectional view of the lure body from the front toward the rear. showing details of the notch in the rib, the water clannel under the notch, and the eye socket.

The invention consists of an artificial fishing lure body (1), manufactured by means of plastic injection molding process, having a nose portion (2), a socket (13), lip and rib (8.12,) with a notch (16) through the rib edge, a groove (7,15), a channel (14), hook attachment points (9,10), and a line tie point (6). An attracting device to be added to the lure body by the angler is made up of a fin assembly (5), molded of flexible plastic material, with a neck area (11) and a ball (3) at its end.

The body (1) includes at each side of the head a socket (13). When the fin assembly is installed on the lure, the ball (3) is pressed into the socket (13). The socket (13) is molded into the lure body (1) at approximately the location of the eye of a baitfish, and is sized slightly smaller than the ball (3). When the ball (3) is pressed into the socket (13) a snug fit is then imparted resulting in a solid holding action of the two parts. The neck area (11) of the fin assembly is then pressed into a notch (16) in the rib edge (12) providing a means of positioning and holding the fin assembly in alignment with the lure body (1).

A groove (7) is molded into the side of the nose portion (2) adjacent to and just above the lip (8). The groove (7) continues from the front of the nose portion (2) to intersect with the notch (16). passing below the notch (16) in the form of a channel (14), and continuing to the body (1) side, thus providing a water passage from the front of the nose portion (2) to the body (1) side.

The groove (15) radiuses to the outside edge of the body (1), providing an exit area of high pressure water to the underside of the installed fin (5).

The rib (12) continues past the notch (16) toward the upper body (1) of the lure, providing a blocking action to the water moving along the groove (7), preventing the escape of the pressure over the top of the lure body (1), forcing the flow of the water to pass through the channel (14).

During retrieval, water is forced by the lip (8), rib (12) and the groove (7) through the channel (14) to the extension of the groove (15), where it is forced away from the lure body (1) by the radius of the groove (15) to the underside of the fin (5). This forces the fin (5) to move away from the body (1). As movement is slowed or stopped, the water pressure under the fin (5) decreases accordingly, resulting in a corresponding motion of the fin (5).

We claim:

1. An artificial fishing lure, comprising;
    a) a lure body having a nose and body portion, a lip, rib, and eye sockets;
    b) a line attachment means on the nose of the body;
    c) hook attaching means on the lure body;
    d) two each fin devices, each including a ball for releaseably mating with the sockets, a neck for releaseably mating with a rib, and a flexible fin depending from the end.

2. A fishing lure as in claim 1 wherein the fin devices comprise a pair of outwardly opposing rearwardly extending fins.

3. A fishing lure as in claim 2 wherein the fins comprise a plurality of interchangeable fin devices, each including a ball at one end to removeably and interchangeably mate with the sockets.

4. The artificial fishing lure of claim 1 wherein a water passageway is defined by a longitudinally extending groove located at each side of the lure nose, adjacent to the rib, extending to a channel under the rib, and further extending, terminating in a concave end, radiusing toward the outside edge of the body, directing water pressure to impinge on the underside of the fin.

* * * * *